L. A. TAYLOR.
HORSE HAY-RAKE.

No. 169,928.

Patented Nov. 16, 1875.

Witnesses
Chas H St John
John B. Borden

Lucian A. Taylor
Inventor
per E B Stocking
Atty.

UNITED STATES PATENT OFFICE.

LUCIAN A. TAYLOR, OF SKANEATELES, NEW YORK.

IMPROVEMENT IN HORSE HAY-RAKES.

Specification forming part of Letters Patent No. 169,928, dated November 16, 1875; application filed July 2, 1875.

*To all whom it may concern:*

Be it known that I, LUCIAN A. TAYLOR, of the town of Skaneateles, Onondaga county, and State of New York, have invented an Improvement in Horse Hay-Rakes, of which the following is a specification:

The object of my invention is to obviate these difficulties, to wit:

I have noticed in existing forms of rakes that the points of the teeth are continually dragging in the turf, collecting, with the crop, dirt, sod, stones, and sticks, and at the same time requiring more power than is necessary to operate them from the fact of such dragging of the teeth. I have also noticed that, upon the completion of the dumping of the rake, the teeth are thrown to the ground, and by their own weight produce such a shock as to hasten the destruction or wearing out of the rake, as well as occasion a loud clatter, which often proves an obstacle to the use of rakes with spirited horses. I have also noticed that, whenever the wheels of a rake are upon elevated ground, and the body of the rake over a depressed surface of ground, the teeth do not reach down to the crop in such a manner as, and deep enough, to collect all the crop.

I attain this object by relieving the rake in all its parts, and especially its teeth, from the shock occasioned by the sudden fall of the rake proper—as after passage of an obstacle, or after a load has been dumped—and by sustaining the rake-teeth flexibly, and by providing a ready means for adjustment of the height of the flexibly-suspended teeth from the ground.

For these purposes my invention consists in the combination of a spring-bar rigidly attached to that part of a horse-rake which supports the rake proper, with adjustable means for connecting the free end of the spring-bar with any suitable part of the horse-rake, which is pivotally attached to the rake proper, and which is so situated as to cause the force of the spring-bar to be exerted through the strap to tend to lift the rake-teeth.

Figure 1:
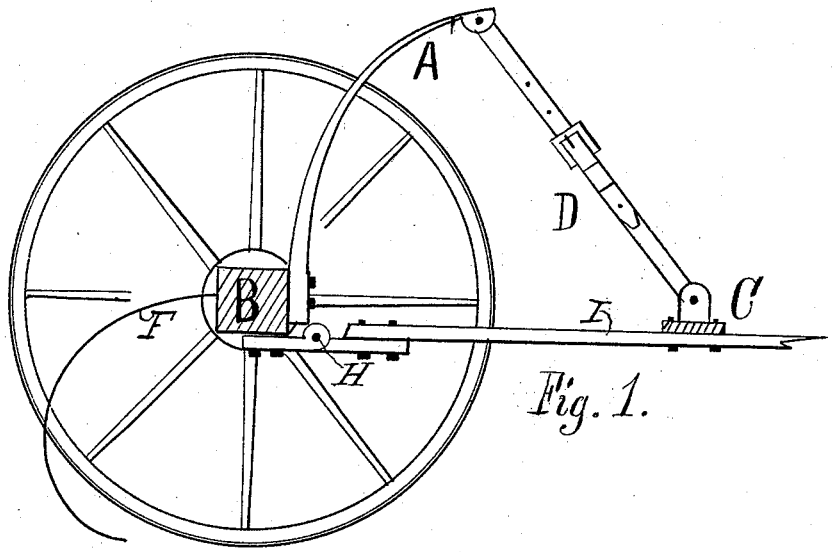
Figure 2:
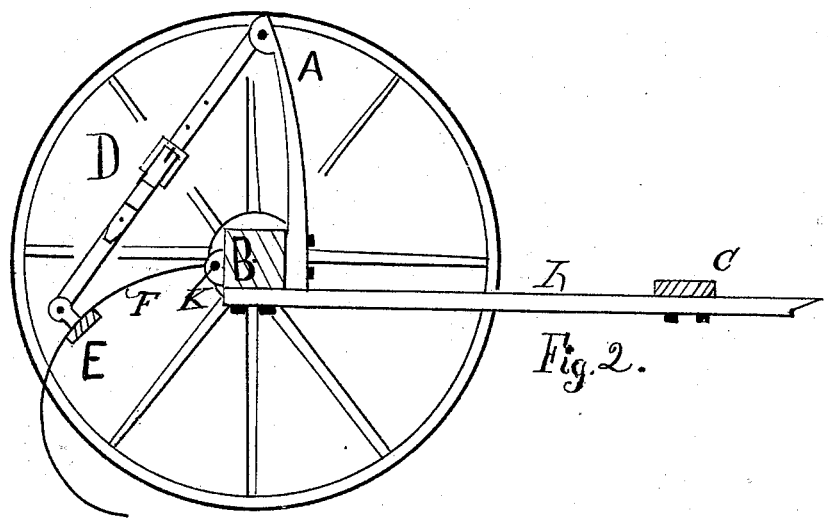

In the drawings, Figures 1 and 2 severally illustrate two modes of applying my invention.

In Fig. 1, B is the axle of the horse-rake, and is also the rake-head, to which the teeth F are fastened. To axle B, at H, shafts I are pivotally attached. C is a cross-bar on shafts I. A is a spring-bar rigidly attached to axle B. D is a strap connecting the free end of the spring-bar with the cross-bar C.

The cross-bar and the axle or rake-head move independently of each other about the pivotal points H. The strap D is short enough to bend the spring-bar; and, the cross-bar and shafts remaining stationary, or nearly so, the force of the spring-bar exerted on the axle rake-head tends to turn it on its axis, and to throw up the rake-teeth, and to hold them flexibly suspended. The length of the strap may be varied, if desired, by buckle D.

In Fig. 2 the shafts are rigidly attached to the axle B, and the rake-head is pivoted on the axle B. As in Fig. 1, the spring-bar A is rigidly attached to the axle, and the strap D to the free end of the bar; but here the other end of the strap D is attached to the teeth-support E. In this mode, the shafts I and axle B being comparatively stationary, the force of the spring tends to move the rake-teeth upward about the rake-head, which is pivoted on the axle B at K, and to hold them flexibly suspended.

Should it be desired, the strap D may be made adjustable by buckle, as shown, to vary the reach of the teeth toward the ground.

The teeth, when once adjusted, remain at the same height above the soil, collecting only the crop; and, in connection with the bearing-down lever commonly attached to horse-rakes, they (the teeth) can be depressed below the line of the bottom of the wheels, and, when dropped after dumping, the force of the fall is expended upon the spring.

I claim—

1. The combination of an axle, a spring-bar rigidly attached thereto, and means for connecting the free end of the spring-bar with any portion of the horse-rake pivotally attached to the axle, and being suitably situated as and for the purpose set forth.

2. The combination of an axle, a spring-bar rigidly attached thereto, and an adjustable means for connecting the free end of the spring-bar with any portion of the horse-rake pivotally attached to the axle, and being suitably situated as and for the purpose set forth.

3. The combination of the axle B, carrying teeth F, spring-bar A, adjustable strap D, pivoted shafts I, and cross-bar C, as and for the purpose set forth.

LUCIAN A. TAYLOR.

Witnesses:
GEO. R. COOK,
ED. B. STOCKING.